US011932984B2

(12) United States Patent
Lee et al.

(10) Patent No.: US 11,932,984 B2
(45) **Date of Patent: *Mar. 19, 2024**

(54) CLOTHES TREATING APPARATUS HAVING DRYING FUNCTION

(71) Applicant: LG ELECTRONICS INC., Seoul (KR)

(72) Inventors: Hyuksoo Lee, Seoul (KR); Seungphyo Ahn, Seoul (KR); Bio Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,702

(22) Filed: Jul. 15, 2022

(65) Prior Publication Data

US 2022/0349113 A1 Nov. 3, 2022

Related U.S. Application Data

(63) Continuation of application No. 17/030,795, filed on Sep. 24, 2020, now Pat. No. 11,421,373, which is a (Continued)

(30) Foreign Application Priority Data

Jun. 18, 2015 (KR) ........................ 10-2015-0086803

(51) Int. Cl.
*D06F 58/22* (2006.01)
*B08B 3/02* (2006.01)
(Continued)

(52) U.S. Cl.
CPC ................ *D06F 58/22* (2013.01); *B08B 3/02* (2013.01); *B08B 3/14* (2013.01); *D06F 58/206* (2013.01); *D06F 58/24* (2013.01)

(58) Field of Classification Search
CPC ........ D06F 58/22; D06F 58/206; D06F 58/24; B08B 3/02; B08B 3/14
See application file for complete search history.

(56) References Cited

U.S. PATENT DOCUMENTS 6,966,126 B2 11/2005 Baurmann
7,373,787 B2 5/2008 Forsberg et al.
(Continued)

FOREIGN PATENT DOCUMENTS

DE 3147360 A1 12/1982
DE 42129565 A1 10/1993
(Continued)

OTHER PUBLICATIONS

European Search Report issued in corresponding EP Patent Application No. 16811827.1 dated Jan. 22, 2019 (9 pages).
(Continued)

*Primary Examiner* — Jessica Yuen
(74) *Attorney, Agent, or Firm* — Birch, Stewart, Kolasch & Birch, LLP

(57) ABSTRACT

A clothes treating apparatus having a drying function includes: a cabinet; a drum provided within the cabinet; a heat-exchanger heat-exchanged with air exhausted from the drum; a lint filter disposed on an upstream side of the heat-exchanger with respect to flow of air exhausted from the drum to collect lint in the air; a spray tube spraying water to the lint filter to separate lint collected in the lint filter from the lint filter; and a lint collecting part at least partially provided below the lint filter or below the heat-exchanger to collect falling lint. Lint in condensate water may be collected, and thus, generation of a bad influence when condensate water is re-used may be suppressed. Also, contact between lint in drying air and the heat-exchanger may be restrained.

23 Claims, 14 Drawing Sheets

Related U.S. Application Data continuation of application No. 15/737,154, filed as application No. PCT/KR2016/005401 on May 20, 2016, now Pat. No. 10,815,610.

(51) Int. Cl.

| | |
|---|---|
| ***B08B 3/14*** | (2006.01) |
| ***D06F 58/20*** | (2006.01) |
| ***D06F 58/24*** | (2006.01) |

(56) References Cited

U.S. PATENT DOCUMENTS

| | | | | |
|---|---|---|---|---|
| 7,412,853 | B2 | 8/2008 | Hong et al. | |
| 8,182,612 | B2 | 5/2012 | Grunert | |
| 8,438,750 | B2 | 5/2013 | Dittmer et al. | |
| 8,615,895 | B2 | 12/2013 | Shin et al. | |
| 8,789,290 | B2 | 7/2014 | Grunert | |
| 10,815,610 | B2 | 10/2020 | Lee et al. | |
| 11,326,300 | B2 * | 5/2022 | Lee | D06F 58/22 |
| 11,421,373 | B2 * | 8/2022 | Lee | D06F 58/22 |
| 2005/0066538 | A1 | 3/2005 | Goldberg et al. | |
| 2005/0086832 | A1 | 4/2005 | Declos | |
| 2012/0246960 | A1 | 10/2012 | Lee et al. | |
| 2013/0255097 | A1 | 10/2013 | Bömmels et al. | |
| 2014/0075682 | A1 | 3/2014 | Filippetti et al. | |

FOREIGN PATENT DOCUMENTS

| | | | |
|---|---|---|---|
| DE | 102006061211 | A1 | 6/2008 |
| EP | 0648885 | A1 | 4/1995 |
| EP | 1 669 487 | A1 | 6/2006 |
| JP | 2000-176223 | A | 6/2000 |
| JP | 3519236 | B2 * | 4/2004 |
| JP | 2009-220693 | A | 10/2009 |
| JP | 2011-46217 | A | 3/2011 |
| JP | 2014-150997 | A | 8/2014 |
| KR | 10-0664286 | B1 | 1/2007 |
| KR | 20080111765 | A * | 12/2008 |
| KR | 10-2011-0125570 | A | 11/2011 |
| KR | 10-2012-0110497 | A | 10/2012 |
| WO | WO 2009/015919 | A1 | 2/2009 |

OTHER PUBLICATIONS

International Search Report issued in Application No. PCT/KR2016/005401, dated Sep. 8, 2016 (4 pages).

* cited by examiner

CLOTHES TREATING APPARATUS HAVING DRYING FUNCTION

CROSS-REFERENCE TO RELATED APPLICATION

This application is a continuation of U.S. application Ser. No. 17/030,795, filed Sep. 24, 2020, which is a continuation of U.S. application Ser. No. 15/737,154, filed Dec. 15, 2017 (now U.S. Pat. No. 10,815,610 B2, issued Oct. 27, 2020), which is the National Stage filing under 35 U.S.C. 371 of International Application No. PCT/KR2016/005401, filed on May 20, 2016, which claims the benefit of earlier filing date and right of priority to Korean Application No. 10-2015-0086803, filed on Jun. 18, 2015, the contents of which are all hereby incorporated by reference herein in their entirety.

BACKGROUND OF THE INVENTION

1. Field of the Invention

The present disclosure relates to a clothes treating having a drying function, and more particularly, to a clothes treating apparatus having a drying function capable of capturing lint in condensate water (or condensed water) and suppressing adverse effects when condensate water is re-used.

2. Background of the Invention

As is well known, in a clothes treating apparatus having a drying function, in a state in which an object to be dried (or a dry target or clothes) is introduced to a rotatable drum, hot air is supplied into the drum while the drum is being rotated to remove moisture from the dry target.

Hot air supplied to the inside of the drum uses heat of combustion of fuel such as electrical resistance heat or gas, and a heat pump is also used in some cases.

In a clothes treating apparatus provided with a heat pump, high temperature air exhausted from a drum is heat-exchanged with an evaporator so as to be cooled and condensed to remove moisture, and air supplied to the drum is heat-exchanged with a condenser to raise the temperature.

When the heat pump is used, heat energy which has been abandoned during a process of exhausting or condensation, may be used to heat air, saving energy consumption as much.

Meanwhile, when air exhausted from the drum is heat-exchanged with a heat-exchanger, lint in the air adheres to the heat-exchanger.

When the lint is adhered to a surface of the heat-exchanger, the heat exchange efficiency of the heat-exchanger is deteriorated and flow resistance of air is increased.

Taking this into consideration, in some cases, a method of removing lint from a surface of the heat-exchanger by supplying condensate water generated during heat-exchange of air to the surface of the heat-exchanger has been presented.

However, in the related art clothes treating apparatus having a drying function, when the lint contained in the condensate water is dried in a state of being adhered to the surface of the heat-exchanger, a binding force between the lint and the heat-exchanger is increased, making it more difficult to remove the lint.

Also, fins of the heat-exchanger is generally formed by cutting a metal member such as aluminum into a rectangular plate shape, and since the fins are disposed in a flow direction of air, the lint is easily adhered to cut surfaces of the fins. Since the cut surfaces of the fins have a larger surface roughness value, when the lint in the air comes into contact with the cut surfaces of the fins, the lint and the cut surfaces of the fins will strongly coupled and may not be easily separated from each other.

In particular, in most cases, a binding force between the lint and the fins exceeds spraying power of water sprayed to remove the lint, and thus, there is a limitation in removing the lint adhered to the heat-exchanger by spraying water.

The lint which has not been removed in spite of the injection of water but remains on the fins of the heat-exchanger may hinder heat exchange efficiency of the heat-exchanger.

RELATED ART DOCUMENT

Patent Document (Patent document 1) U.S. Pat. No. 8,182,612 B2 (2012 May 22.)

SUMMARY OF THE INVENTION

Therefore, an aspect of the detailed description is to provide a clothes treating apparatus having a drying function, capable of suppressing occurrence of adverse effects caused by lint when condensate water is re-used, by collecting lint from the condensate water.

Another aspect of the detailed description is to provide a clothes treating apparatus having a drying function in which contact between lint in drying air and a heat-exchanger may be suppressed.

Another aspect of the detailed description is to provide a clothes treating apparatus having a drying function, capable of easily collecting and removing lint in drying air.

Another aspect of the detailed description is to provide a clothes treating apparatus having a drying function, capable of suppressing vibration and noise during a drying process.

To achieve these and other advantages and in accordance with the purpose of this specification, as embodied and broadly described herein, a clothes treating apparatus having a drying function includes: a cabinet; a drum provided within the cabinet; a heat-exchanger heat-exchanged with air exhausted from the drum; a lint filter disposed on an upstream side of the heat-exchanger with respect to flow of air exhausted from the drum to collect lint in the air; a spray tube spraying water to the lint filter such that lint collected in the lint filter is separated from the lint filter; and a lint collecting part provided below the lint filter or below the heat-exchanger to collect falling lint.

The lint filter may be disposed to be sloped with respect to a vertical direction of the cabinet.

The lint filter may include a frame having at least one opening; and a mesh part provided in the opening and allowing passage of air and restraining passage of lint.

A space between an upper portion of the mesh part and the heat-exchanger may be smaller than a space between a lower portion of the mesh part and the heat-exchanger.

The lint filter may have a heat-exchanger coupling part coupled to the heat-exchanger.

The heat-exchanger may have end plates respectively provided at both end portions thereof, and the heat-exchanger coupling part may have a hook coupled to each end plate.

Each end plate may have a bent part bent in a longitudinal direction of the heat-exchanger, and the hook may be formed to be in contact with an outer surface of each end plate and a rear surface of the bent part.

The spray tube may be provided in plurality, and the plurality of spray tubes may be disposed to be spaced apart from each other horizontally with respect to a flow direction of air.

An outlet of each spray tube may be provided on an upstream side of the lint filter with respect to a flow direction of air.

A space between an upper portion of the mesh part and the heat-exchanger may be greater than a space between a lower portion of the mesh part and the heat-exchanger.

The frame may have a spacer maintaining a space between the frame and the heat-exchanger.

An outlet of the spray tube may be provided on a downstream side of the lint filter with respect to a flow direction of air.

The spray tube may include a first spray part spraying water to the lint filter; and a second spray part spraying water to the heat-exchanger.

The lint collecting part may include: a bottom part; and a side wall part extending upward from the edges of the bottom part.

The bottom part may be configured to allow passage of water and restrain passage of lint.

The cabinet may include a lint collecting part opening allowing the lint collecting part to be drawn out.

The clothes treating apparatus may further include: a heat pump including a compressor compressing a refrigerant, a condenser condensing a refrigerant, an expander expanding a refrigerant, and an evaporator evaporating a refrigerant, and disposed within the cabinet, wherein the heat-exchanger may include the evaporator of the heat pump.

The heat-exchanger may further include the condenser of the heat pump provided on a downstream side of the evaporator with respect to a flow direction of air, and the clothes treating apparatus may further include: a condenser lint filter provided on an upstream side of the condenser along the flow direction of air.

The clothes treating apparatus may further include: a water supply part supplying water to the spray tube, and the water supply part may supply condensate water generated in the evaporator to the spray tube.

The water supply part may include: a pump pumping the condensate water; and a pump connection part having one side connected to the spray tube and the other side connected to the pump.

The water supply part may further include: a water supply source connection part branched from the pump connection part and connected to a water supply source.

To achieve these and other advantages and in accordance with the purpose of this specification, as embodied and broadly described herein, a clothes treating apparatus having a drying function includes: a cabinet; a drum provided within the cabinet; a heat-exchanger heat-exchanged with air exhausted from the drum; a spray tube spraying water to the heat-exchanger such that lint is separated from the heat-exchanger; and a lint collecting part provided below the heat-exchanger and collecting falling lint.

As described above, according to an embodiment of the present disclosure, since the lint collecting part is at least partially provided below the lint filter or below the heat-exchanger, lint of condensate water may be collected to suppress a negative influence when condensate water is re-used.

Also, since the lint filter is provided on the upstream side of the heat-exchanger, contact between lint in the drying air and the heat-exchanger may be suppressed.

Also, since the lint filter is provided on the upstream side of the heat-exchanger and the lint collecting part is at least partially provided below the lint filter or below the heat-exchanger, lint in drying air may be easily collected and removed.

Also, since the evaporator coupling part is provided in the lint filter, generation of vibration of the lint filter may be suppressed to restrain generation of noise due to vibration.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, an embodiment of the present disclosure will be described in detail with reference to the accompanying drawings.

In this disclosure, like numbers refer to like elements throughout although the embodiments are different. As used herein, the singular forms "a", "an" and "the" are intended to include the plural forms as well, unless the context clearly indicates otherwise.

The present disclosure relates to a clothes treating apparatus having a drying function, capable of suppressing contact between lint in circulating air and a heat-exchanger.

Figure 1:
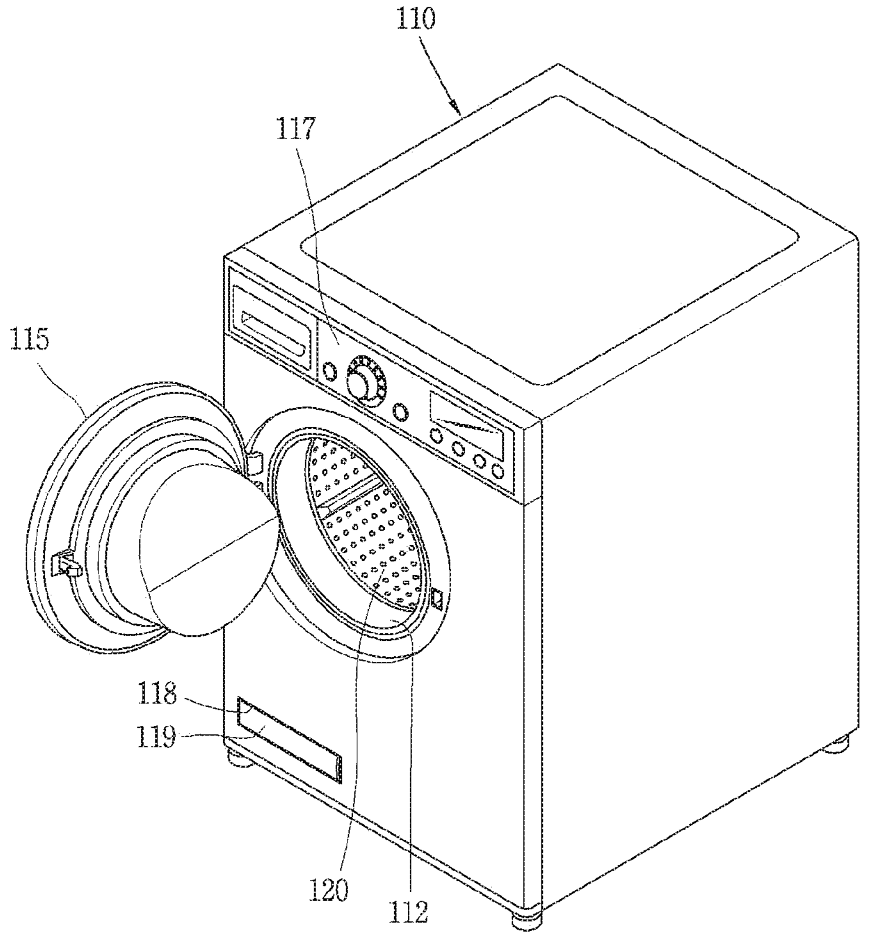
FIG. 1 is a perspective view of a clothes treating apparatus having a drying function according to an embodiment of the present disclosure.
Figure 2:
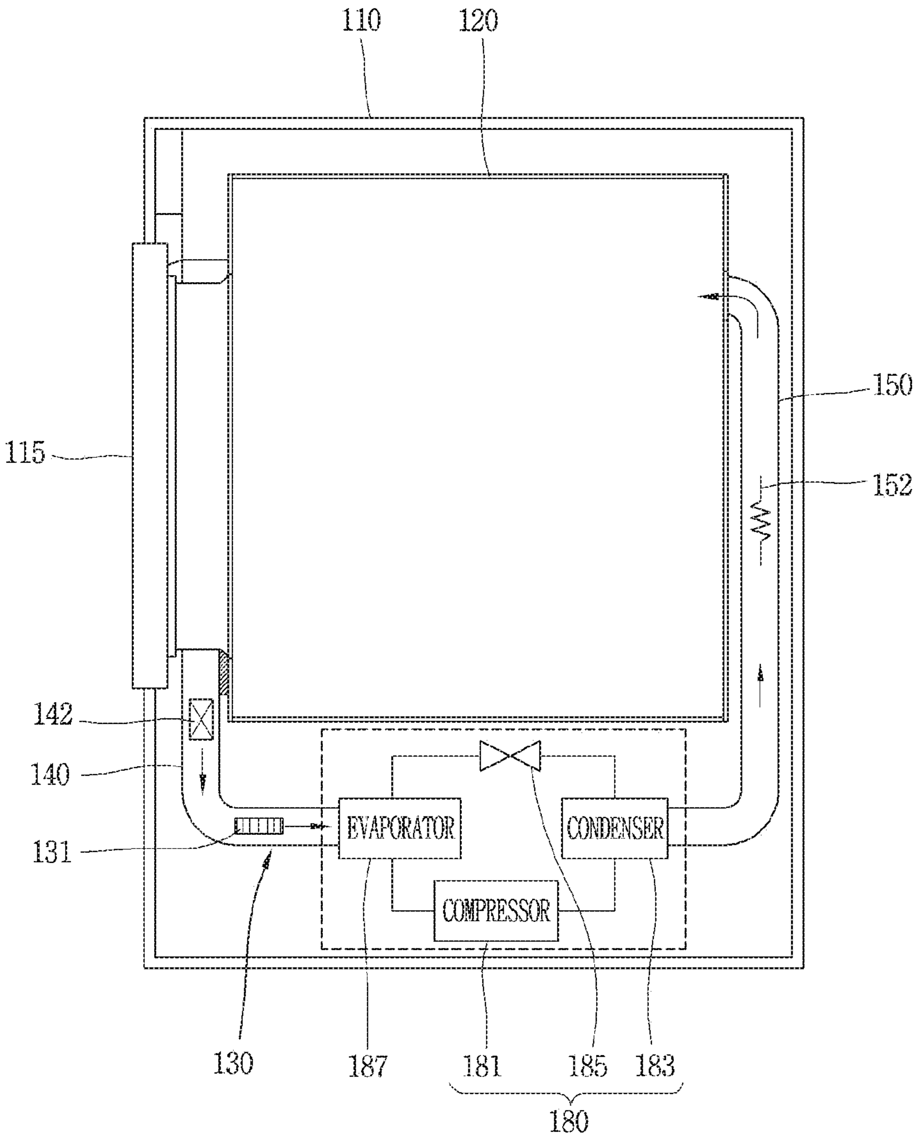
FIG. 2 is a cross-sectional view of the clothes treating apparatus of FIG.

As illustrated in FIGS. 1 and 2, a clothes treating apparatus having a drying function according to an embodiment of the present invention includes a cabinet 110, a drum 120 installed inside the cabinet 110, a heat-exchanger 182 heat-exchanged with air exhausted from the drum 120, a lint filter 210*a* disposed on an upstream side of the heat-exchanger 182 with respect to flow of air exhausted from the drum 120 and collecting lint in the air, a spray tube 250*a* for spraying water to the lint filter 210*a* so that lint collected in the lint filter 210*a* may be separated from the lint filter 210*a*, and a lint collecting part 310 having at least a portion (region) provided below the lint filter 210*a* or below the heat-exchanger 182 to collect falling lint.

The cabinet 110 forms an appearance and may have a substantially rectangular parallelepiped shape.

The cabinet 110 may have an inlet 112 provided on a front surface thereof to allow clothes to be introduced to the inside of the cabinet 110 therethrough, for example.

The cabinet 110 may have a door 115 opening and closing the inlet 112.

The cabinet 110 may have a control panel 117 for inputting operation and/or control signals, for example.

The drum 120, in which a drying object is received, may be rotatably installed in the cabinet 110.

For example, the drum 120 may have a cylindrical shape with one side opened. The drum 120 may have a lifter that protrudes in a radial direction and extends in an axial direction so as to tumble the clothes to be dried.

The clothes treating apparatus having a drying function of the present embodiment may be configured as a so-called a circulating dryer" in which air exhausted from the drum 120 is reintroduced into the drum 120.

However, the present invention is not limited thereto, and a so-called an "exhaust type dryer" in which exhausted air is discharged to the outside of the cabinet 110.

Hereinafter, in the present disclosure, a circulating dryer will be described as an example.

A circulation flow channel 130 may be provided below the drum 120 such that air exhausted from the drum 120 circulates to be re-introduced to the inside of the drum 120 via the outside of the drum 120.

Here, the circulation flow channel 130 may refer to a movement path of air from a point where air is discharged from the drum 120 to a point where discharged air is re-introduced to the drum 120.

The circulation flow channel 130 may include a heat pump 180 removing moisture in the air drawn out from the drum 120 and performing heat exchange with the air to raise the temperature.

The heat pump 180 includes, for example, a compressor 181 compressing a refrigerant, a condenser 183 dissipating heat from the refrigerant, an expander 185 expanding the refrigerant, and an evaporator 187 evaporating the refrigerant by absorbing the latent heat.

The evaporator 187 may be installed in the circulation channel 130 to cool air exhausted from the drum 120.

Air exhausted from the drum 120 is heat-exchanged with the evaporator 187 so as to be cooled, condensing moisture to be removed, thereby improving a degree of drying air.

In addition, the condenser 183 may be installed in the circulation flow channel 130 to heat air.

Here, the condenser 183 may be disposed on a downstream side of the evaporator 187 along a flow direction of air exhausted from the drum 120.

Accordingly, low-temperature air which is cooled by the evaporator 187 and does not have moisture may be heated by the evaporator 187 to become hot, dry air.

A condensate water collecting part 172 may be provided below the evaporator 187 and the condenser 183 to collect and temporarily store the condensate water generated in the evaporator 187.

The compressor 181 and the expander 185 may be provided outside the circulation flow channel 130.

Meanwhile, a lint filter installation part 140 may be provided on the upstream side of the circulation flow channel 130. The lint collecting filter 142 collecting lint in the air exhausted from the drum 120 may be installed in the lint filter installation part 140.

Thus, as lint in the air exhausted from the drum 120 is collected, lint in the air exhausted from the drum 120 may be reduced.

A back duct 150, through which air is introduced to the inside of the drum 120, is provided in a rear region of the drum 120.

The back duct 150 may have an electric heater 152 as a heating means for heating air flowing into the drum 120, for example.

The circulation flow channel 130 may include a blow fan 131 accelerating flow of air.

Meanwhile, a base 160, which forms part of the circulation flow channel 130, may be provided below the drum 120.

That is, the base 160 may be disposed between the lint filter installation part 140 and the back duct 150 and communicate with the lint filter installation part 140 and the back duct 150 such that air exhausted from the drum 120 may circulate therein.

Figure 3:
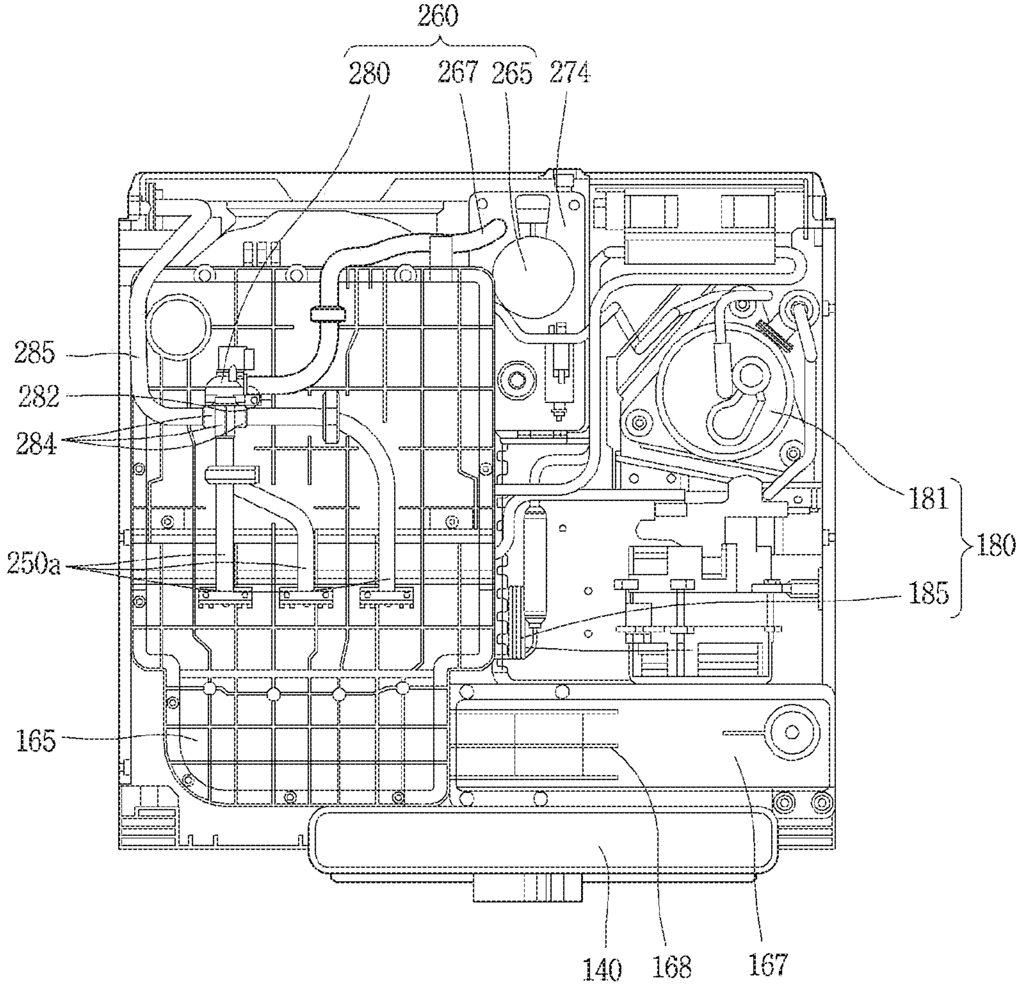
FIG. 3 is a plan view of a base in a lower region of a drum of FIG. 2.
Figure 4:
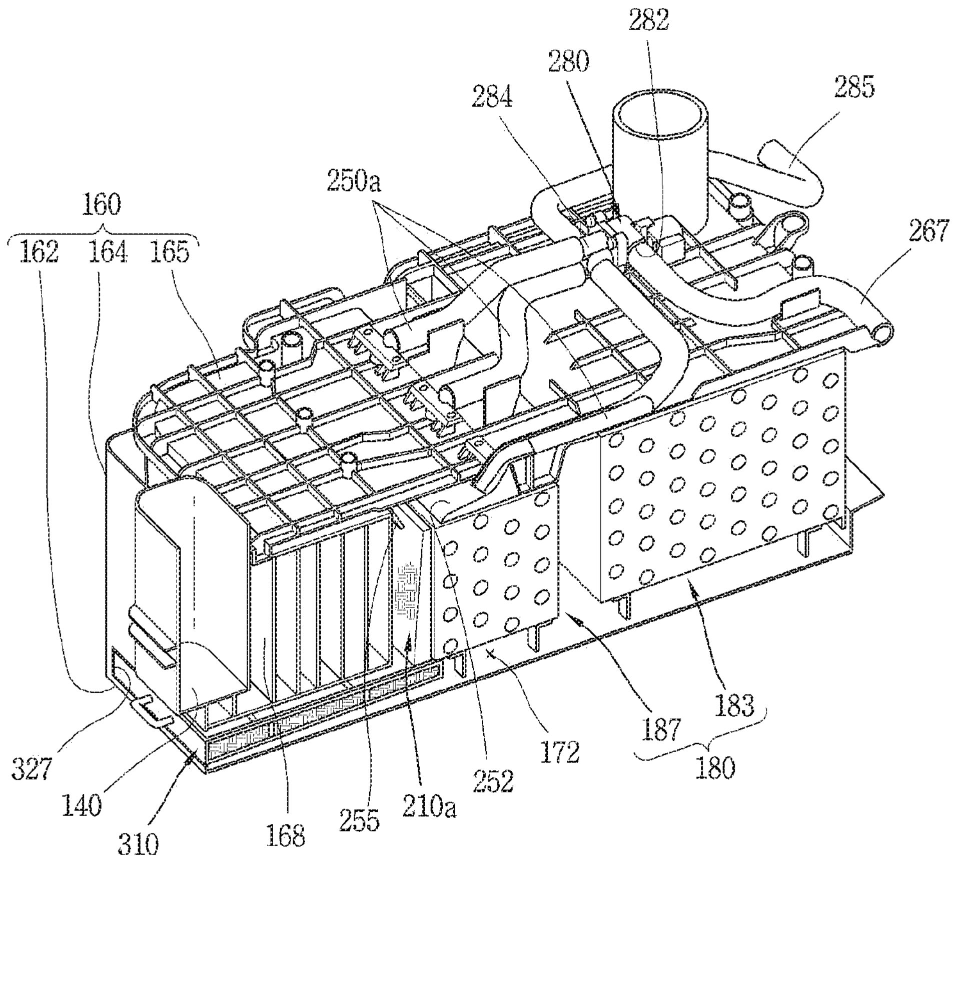
FIG. 4 is a partially cutaway perspective view of the base of FIG. 3.

For example, as shown in FIGS. 3 and 4, the base 160 may form part of the circulation flow channel 130 and may be configured to stably support the heat pump 180.

The base 160 may include, for example, a bottom surface 162, two side surface parts 164 extending upwardly from both sides of the bottom surface 162, and a cover plate 162 disposed above the both side surface parts 164.

Referring to FIG. 3, the circulation flow channel 130 in which the evaporator 187 and the condenser 183 are installed may be formed on the left region of the cover plate 165 in the drawing, and the compressor 181 and the expander 185 may be installed on the right region of the cover plate 165 in the drawing.

In detail, the aforementioned lint filter installation part 140 is disposed in a front region of the base 160, and an guiding part 167 may be installed at a front surface end portion of the base 160 and connected to communicate with the lint filter installation part 140 to guide air, which has passed through the lint filter installation part 140, toward the evaporator 187.

The guiding part 167 may include a plurality of guide vanes 168 spaced apart from each other in parallel so that the air which has passed through the lint filter installation part

140 is not biased toward one side but is appropriately distributed and introduced to the evaporator 187.

Figure 5:
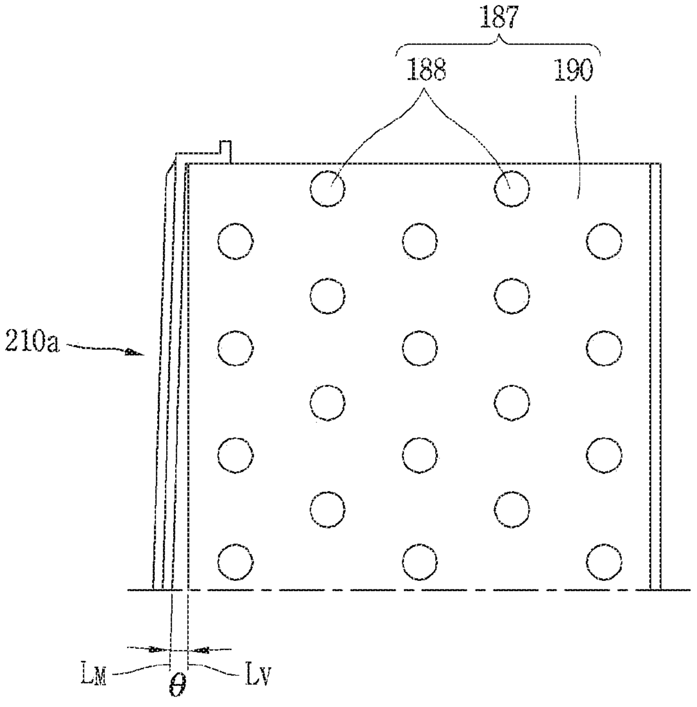
FIG. 5 is a cross-sectional view illustrating a state in which an evaporator and a lint filter of FIG. 4 are coupled.
Figure 6:
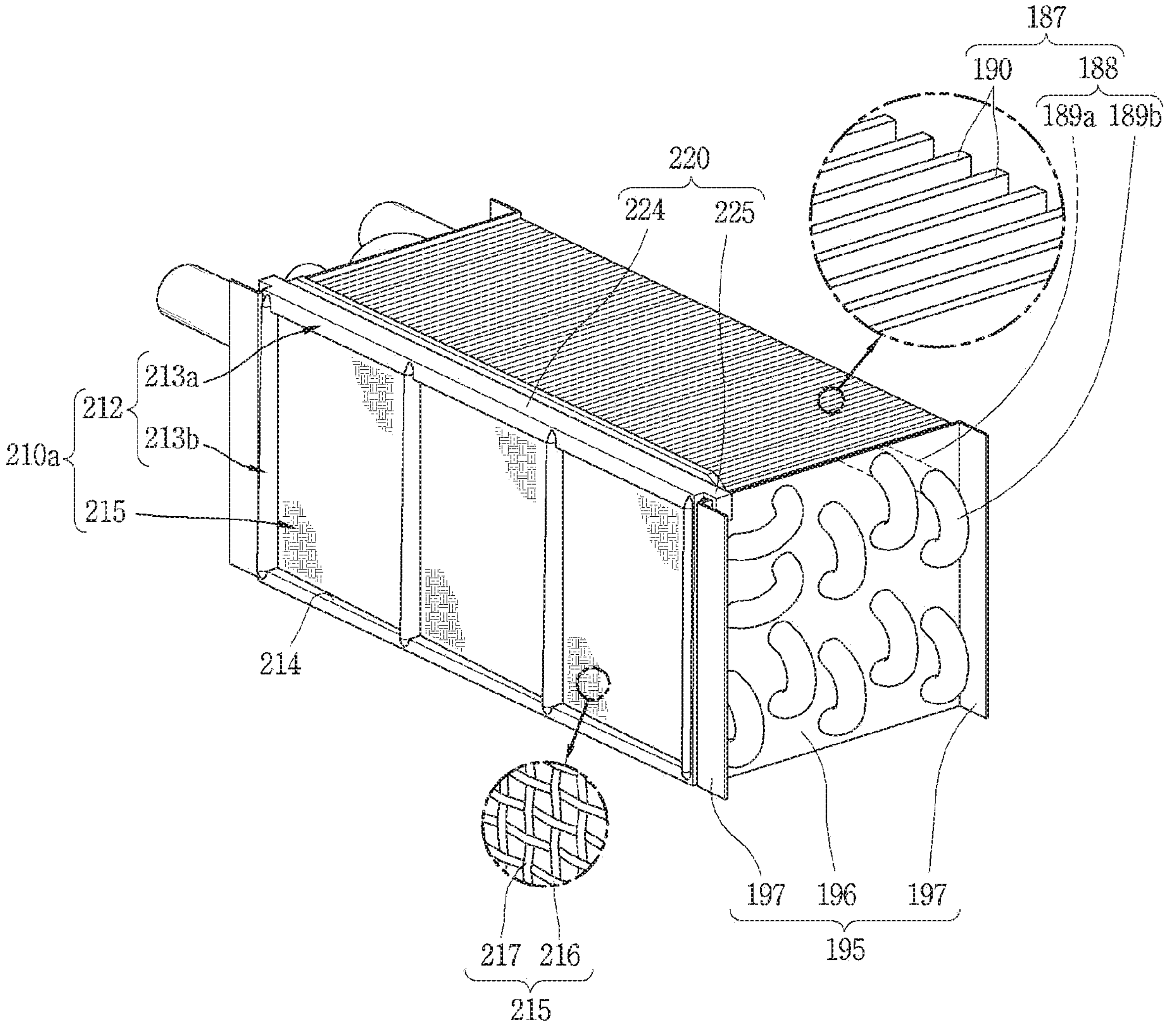
FIG. 6 is a perspective view illustrating a state in which an evaporator and a lint filter of FIG. 3 are coupled.

As illustrated in FIGS. 5 and 6, the heat-exchanger 182 may include a refrigerant pipe 188 in which refrigerant flows and a plurality of fins 190 coupled to the refrigerant pipe 188.

Here, the heat-exchanger 182 may be, for example, the evaporator 187 which cools air exhausted from the drum 120.

The refrigerant pipe 188 of the heat-exchanger 182 (the evaporator 187) may include a plurality of linear sections 189*a* spaced apart from each other and a plurality of curved sections 189*b* connecting the linear sections 189*a* in a communicating manner to form a zigzag refrigerant flow channel.

The fins 190 may have a rectangular plate shape, for example.

More specifically, the fins 190 may be formed by cutting a plate-shaped metal member (e.g., aluminum) into a rectangular shape.

The cut fins 190 may be coupled to be spaced apart from each other at a predetermined interval (pitch) in consideration of a heat exchange amount with air on a circumference of the linear section 189*a* of the refrigerant pipe 188.

Meanwhile, a lint filter 210*a* for collecting lint in the air may be provided on the upstream side of the heat-exchanger 182 (e.g., the evaporator 187) along a flow direction of air exhausted from the drum 120.

Accordingly, contact between lint in the air exhausted from the drum 120 and the heat-exchanger 182 (the evaporator 187) may be suppressed and (an amount of) lint adhered to the heat-exchanger 182 (evaporator 187) may be eventually reduced.

The lint filter 210*a* may have a substantially rectangular plate shape corresponding to a shape of the heat-exchanger 182 to effectively collect lint in air, while reducing air resistance, for example.

The lint filter 210*a* may include, for example, a frame 212 having at least one opening 214 and a mesh part 215 provided in the opening portion 214 to allow air to pass therethrough and restrain passage of lint.

The frame 212 includes, for example, a first frame 213*a* which is horizontally disposed and a second frame 213*b* disposed to be perpendicular to the first frame 213*a* and having both end portions connected to the first frame 213*a*.

A case where the frame 212 of the present embodiment has three openings 214 and three mesh parts 215 is illustrated, but the number of the openings 214 and the mesh parts 215 may be adjusted appropriately.

Also, in this embodiment, a case where two first frames 213*a* spaced apart from each other vertically and four second frames 213*b* connected to the first frame 213*a* are illustrated, but the number of the first frame 213*a* and the second frame 213*b* may be appropriately adjusted.

The frame 212 may be formed of a synthetic resin member.

The mesh part 215 may be formed of a metal member or a synthetic resin member.

The mesh part 215 may have a mesh having a predetermined size in consideration of flow resistance of air and a size of lint.

The mesh part 215 of the lint filter 210*a* may include a horizontal wire 216 and a vertical wire 217 that cross each other at a right angle.

Here, surfaces of the wires 216 and 217 of the mesh part 215 may have a smaller (smooth) surface roughness value than the cut surface of the fin 190.

Accordingly, separation and removal of lint collected in the mesh part 215 is remarkably facilitated, compared with separation and removal of lint adhered to the cut surface of the fin 190 of the heat-exchanger 182.

According to this configuration, since air exhausted from the drum 120, before coming into contact with the evaporator 187, first passes through the lint filter 210*a* to allow lint in the air to be collected, an amount of lint in contact with the evaporator 187 may be significantly reduced.

Thus, it is possible to suppress an increase in flow resistance of air due to lint adhered to the surface of the evaporator 187.

Also, degradation of heat exchange efficiency between air and a refrigerant due to lint adhered to the surface of the evaporator 187 may be restrained.

Meanwhile, in the present embodiment, the lint filter 210*a* may be arranged to be sloped with respect to a vertical direction Lv of the cabinet 110 so as to easily remove the collected lint, for example.

Since lint is collected by the mesh part 215 of the lint filter 210*a*, a vertical central line LM of the mesh part 215 of the lint filter 210*a* has a preset tilt angle θ with respect to the vertical direction Lv of the cabinet 110.

More specifically, the lint filter 210*a* is disposed such that a distance between an upper portion of the mesh part 215 and the evaporator 187 is smaller than an interval between a lower portion of the mesh part 215 and the evaporator 187.

The lint filter 210*a* may be installed such that the interval between the evaporator 187 and the mesh part 215 is increased toward a lower portion of the mesh part 215.

The lint filter 210*a* may be disposed such that the mesh part 215 has a tilt angle θ equal to or greater than 2° with respect to the vertical direction Lv of the cabinet 110.

Here, if the tilt angle of the mesh part 215 with respect to the vertical direction Lv of the cabinet 110 of the lint filter 210*a* is less than 2°, performance of removing lint collected in the lint filter 210*a* may be relatively degraded.

Figure 7:
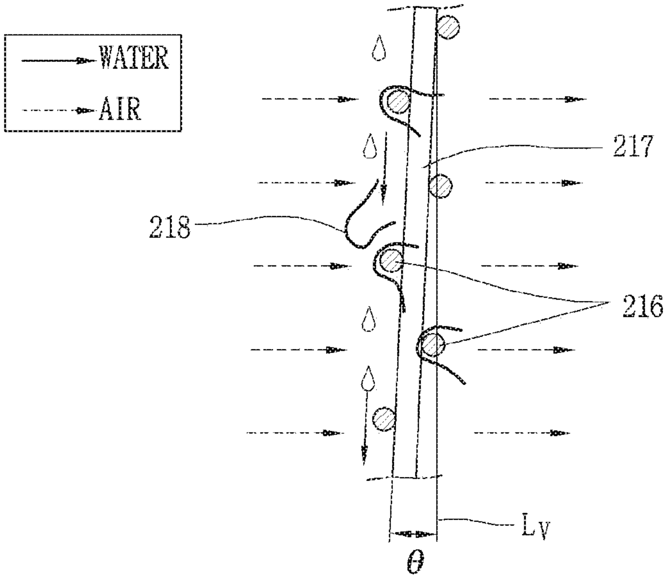
FIG. 7 is an enlarged cross-sectional view illustrating a mesh part of a lint filter of FIG. 4.

A process of collecting lint by the lint filter 210*a* will be described in detail with reference to FIG. 7.

Lint 218 in the air exhausted from the drum 120 may pass through the mesh part 215 of the lint filter 210*a* together with the air.

Here, both end portions of each lint 218 in the air may pass through different meshes formed by transverse wires 216 and longitudinal wires 217 of the mesh part 215 of the lint filter 210*a*, and a central portion of the lint 218 may be caught by the transverse wire 216 and/or the longitudinal wire 217 so as to be captured in the mesh part 215.

Since the lint filter 210*a* of the present embodiment is disposed to be sloped with respect to the vertical direction of the cabinet 110, the central portion of the lint 218 captured by the mesh part 215 is positioned on the upstream side of the mesh part 215 with respect to a flow direction of air and both end portions of the lint 218 are disposed on a downstream side of the mesh part 215, and thus, the central portion of the lint 218 is disposed on a lower side of the lint 218, relative to both end portions of the lint 218. Accordingly, when an external force acts downwardly on the lints 218 captured by the mesh part 215, the lints 218 may be easily separated from the wires 216 and 217.

The evaporator 187 may have end plates 195 provided on both sides of the evaporator 187 such that the linear sections 189*a* and/or the fins 190 are stably supported, while maintaining a preset interval therebetween.

The end plate 195 may include a body 196 having a rectangular shape and bent parts 197 bent on both sides of the body 196 along a longitudinal direction of the heat-exchanger 182.

The lint filter 210*a* may include an evaporator coupling part 220 so as to be coupled to the evaporator 187.

The evaporator coupling part 220 may be formed to detachably attach the lint filter 210*a* to the heat-exchanger 182.

The lint filter 210*a* may have a length corresponding to a length of the evaporator 187.

In detail, the length of the frame 212 of the lint filter 210*a* may correspond to (substantially equal to) a distance between end plates 195 of the evaporator 187.

That is, the lint filter 210*a* may have a length that allows the bent parts 197 of the end plates 195 to be disposed on both sides of the frame 212 of the lint filter 210*a*.

Meanwhile, the evaporator coupling part 220 may include a hook 225 that is in contact with both ends of the evaporator 187.

The lint filter 210*a* may be provided with a hook support part 224 supporting the hook 225.

The hook support part 224 may have a long plate shape that is bent backward from an upper end of the frame 212 of the lint filter 210*a* and extends horizontally, for example.

The hooks 225 may be provided at both ends of the hook support part 224.

Figure 8:
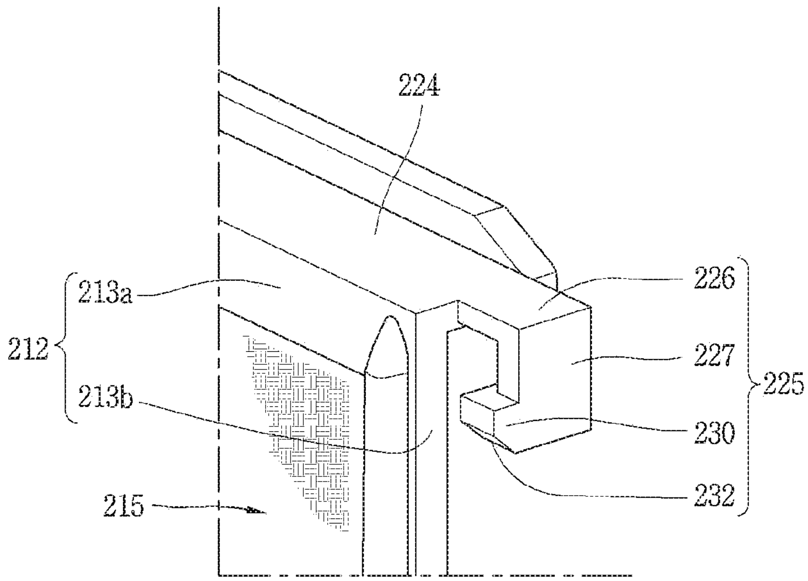
FIG. 8 is an enlarged view of a hook region of a lint filter of FIG. 7.
Figure 9:
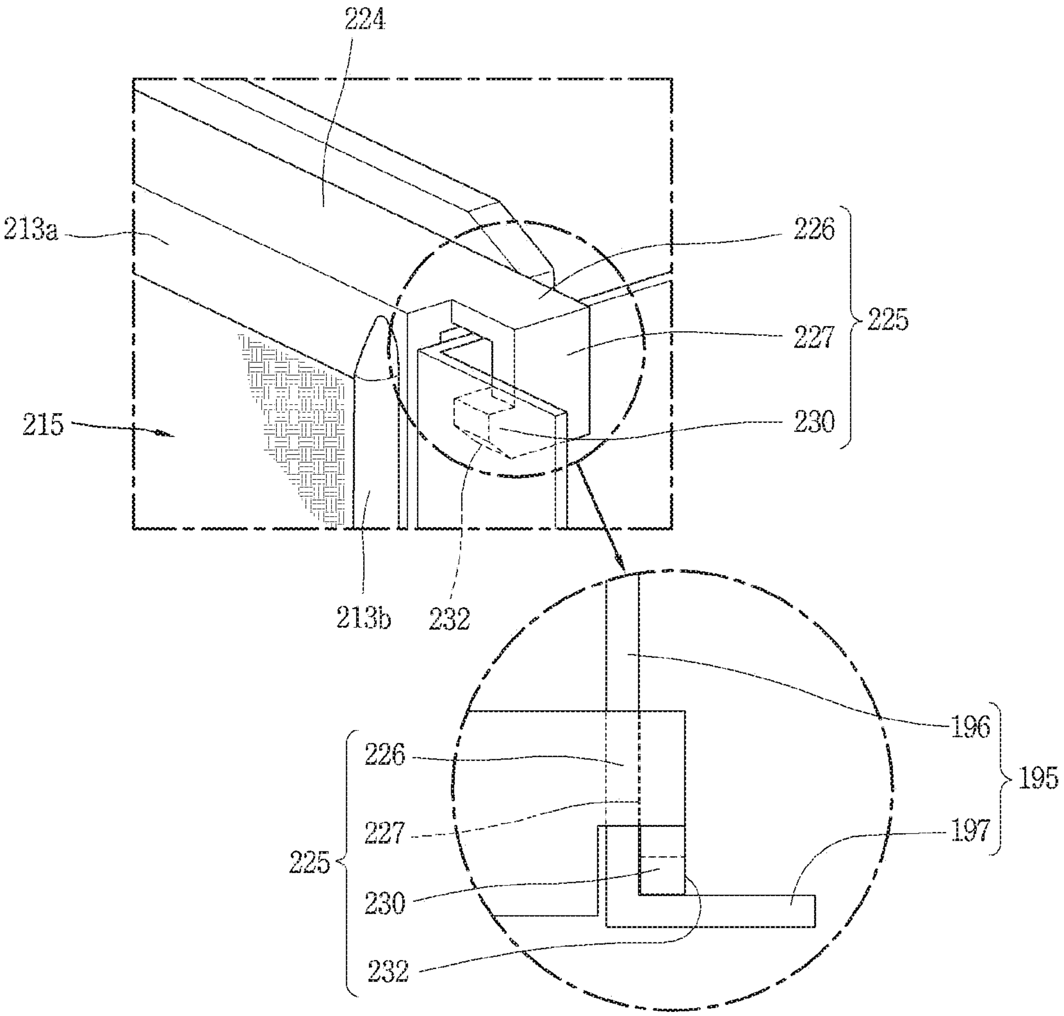
FIG. 9 is an enlarged view of a lint filter of FIG. 4.

As illustrated in FIGS. 8 and 9, each of the hooks 225 may include a horizontal section 226 and a vertical section 227.

The horizontal section 226 may extend from both ends of the hook support part 224 in a horizontal direction along a longitudinal direction.

The vertical section 227 may be bent downward from an end portion of the horizontal section 226 so that an inner surface of the vertical section 227 may contact the end plate 195.

In detail, an inner surface of the vertical section 227 may be in contact with an outer surface of the end plate 195 so that the lint filter 210*a* is prevented from moving along the longitudinal direction of the evaporator 187.

Here, the hook 225 may be configured to be coupled to the end plate 195 with slight interference, for example.

In detail, a distance (width) between the vertical sections 227 of the hook 225 may be slightly smaller than a distance between outer surfaces of the end plates 195.

According to the configuration, the hook 225 may expand outward due to an elastic force of the hook 225 so as to be coupled to the outer surface of the end plate 195.

Accordingly, a coupling force between the lint filter 210*a* and the evaporator 187 is increased, so that a coupled state of the lint filter 210*a* and the evaporator 187 may be stably maintained.

More specifically, a movement of the evaporator 187 along a left-right direction (longitudinal direction) may be prevented. According to the configuration, since the lint filter 210*a* is fixed with respect to the left-right direction of the evaporator 187, generation of vibrations due to a movement of the lint filter 210*a* in the left-right direction may be restrained when air exhausted from the drum 120 circulates.

Each of the hooks 225 may be in contact with the bent part 197 of the end plate 195 to prevent movement of the lint filter 210*a* in a thickness direction of the evaporator 87.

The hooks 225 may be configured to be in contact with rear surfaces of the bent parts 197 of the end plate 195, respectively.

More specifically, for example, each of the hooks 225 may include a contact protrusion 230 contacting the rear surface of the bent part 197.

The contact protrusion 230 may protrude from the vertical section 227.

On one side of the contact protrusion 230, a guide slope 232 formed to be sloped upward forward may be provided.

When the lint filter 210*a* and the evaporator 187 are coupled to each other, the guide slope 232 guides the contact protrusion 230 to be brought into contact with the bent part 197 of the end plate 195 and move to a rear surface of the bent part 197.

According to this configuration, after the lint filter 210*a* is coupled, the bent part 197 of the end plate 195 and the contact protrusion 230 are in contact with each other, increasing a coupling force therebetween to restrain generation of a movement.

Accordingly, since the lint filter 210*a* is fixed in a forward/backward direction, when during air exhausted from the drum 120 circulates to flow, generation of vibrations of the lint filter 210*a* in the forward/backward direction due to a gap along the forward/backward direction of the lint filter 210*a* may be suppressed.

In addition, generation of noise due to vibration of the lint filter 210*a* in the forward/backward direction may be suppressed.

Here, the contact protrusion 230 may be configured to elastically contact the bent part 197 of the end plate 195.

According to this, a coupling force between the hook 225 and the end plate 195 is further increased so that generation of a gap between the contact protrusion 230 and the bending part 197 in a forward/backward direction may be significantly reduced.

Meanwhile, the spray tube 250*a* for spraying water to the lint filter 210*a* may be provided on one side of the lint filter 210*a* in order to separate lint collected in the lint filter 210*a*.

Referring to FIG. 4, the spray tube 250*a* may be provided above the evaporator 187 to increase contact between sprayed water and the lint filter 210*a*.

The spray tube 250*a* may be provided on an upper and outer side of the base 160.

An outlet of the spray tube 250*a* may be inserted into the cover plate 165, for example.

Each of the spray tubes 250*a* may have a diffuser 252.

The diffuser 252 may be formed such that a flow cross-sectional area increases toward an outlet along a movement direction of water.

Accordingly, a speed of water decreases toward the outlet of the diffuser 252 and flow of water may be stabilized.

The outlet of the diffuser 252 may be disposed on the upstream side of the lint filter 210*a* along the air flow direction.

In the outlet region of the diffuser 252, for example, a guide plate 255 for guiding water may be provided.

The guide plate 255 may be sloped downward to guide water toward a front upper portion of the lint filter 210*a*.

Accordingly, water which has passed through the outlet of the spray tube 250*a* is guided to the front surface (upper portion) of the lint filter 210*a* and flows downward along the mesh part 215 of the lint filter 210*a* to wash out the lint 218 collected in the mesh part 215 to separate and remove the lint 218 from the mesh part 215.

The spray tube 250*a* may be provided in plurality to wash the lint filter 210*a* by sections, for example.

Accordingly, it is possible to wash the lint filter 210*a* with a relatively small amount of water.

The plurality of spry tubes 250*a* may be spaced apart from each other in a longitudinal direction of the lint filter 210*a* and respectively provided in the mesh parts 215 of the lint filter 210*a*.

In the present disclosure, three spray tubes 250*a* are provided and respectively disposed in the three mesh parts 215, and here, the number of the mesh parts 215 and the number of spray tubes 250*a* may be appropriately adjusted.

Meanwhile, a water supply part 260 supplying water to the spray tube 250*a* may be provided on one side of the spray tube 250*a*.

The water supply part 260 may be configured to supply condensate water generated in the evaporator 187 to the spray tube 250*a*.

The water supply part 260 may include, for example, a pump 265 pumping the condensate water and a pump connection part 267 connected to the spray tube 250*a* at one side and to the pump 265 at the other side.

The water supply part 260 may include a valve unit 280 for opening and closing the spray tube 250*a* so as to selectively supply water.

The valve unit 280 may include an inlet 282 through which water is introduced and an outlet 284 through which water is discharged.

The valve unit 280 may include a plurality of outlets 284 to supply water to different regions.

The plurality of spray tubes 250*a* may be connected to some of the plurality of outlets 284, respectively.

Also, a drain pipe 285 may be connected to any one of the plurality of outlets 284 to discharge water to the outside.

Here, the drain pipe 285 may be configured to be connected to, for example, a condensate water storage tank (not shown) storing condensate water.

In this case, the condensate water storage tank may be constructed such that, for example, the user may directly discard water stored therein.

Meanwhile, the other end of the pump connection part 267 connected to the pump 265 may be connected to the inlet 282, for example.

A pump 265 may be provided on one side of the valve unit 280.

A condensate water storage 174 may be provided on one side of the pump 265.

The condensate water storage 174 may be formed to communicate with the condensate water collecting part 172 in a lower region of the evaporator 187, for example.

Accordingly, the condensate water generated by the evaporator 187 may be temporarily stored in the condensate water collecting part 172 and subsequently moved to and stored in the condensate water storage 174.

The condensate water storage 174 may include a water level sensing unit 360 to sense a level of the condensate water.

Figure 11:
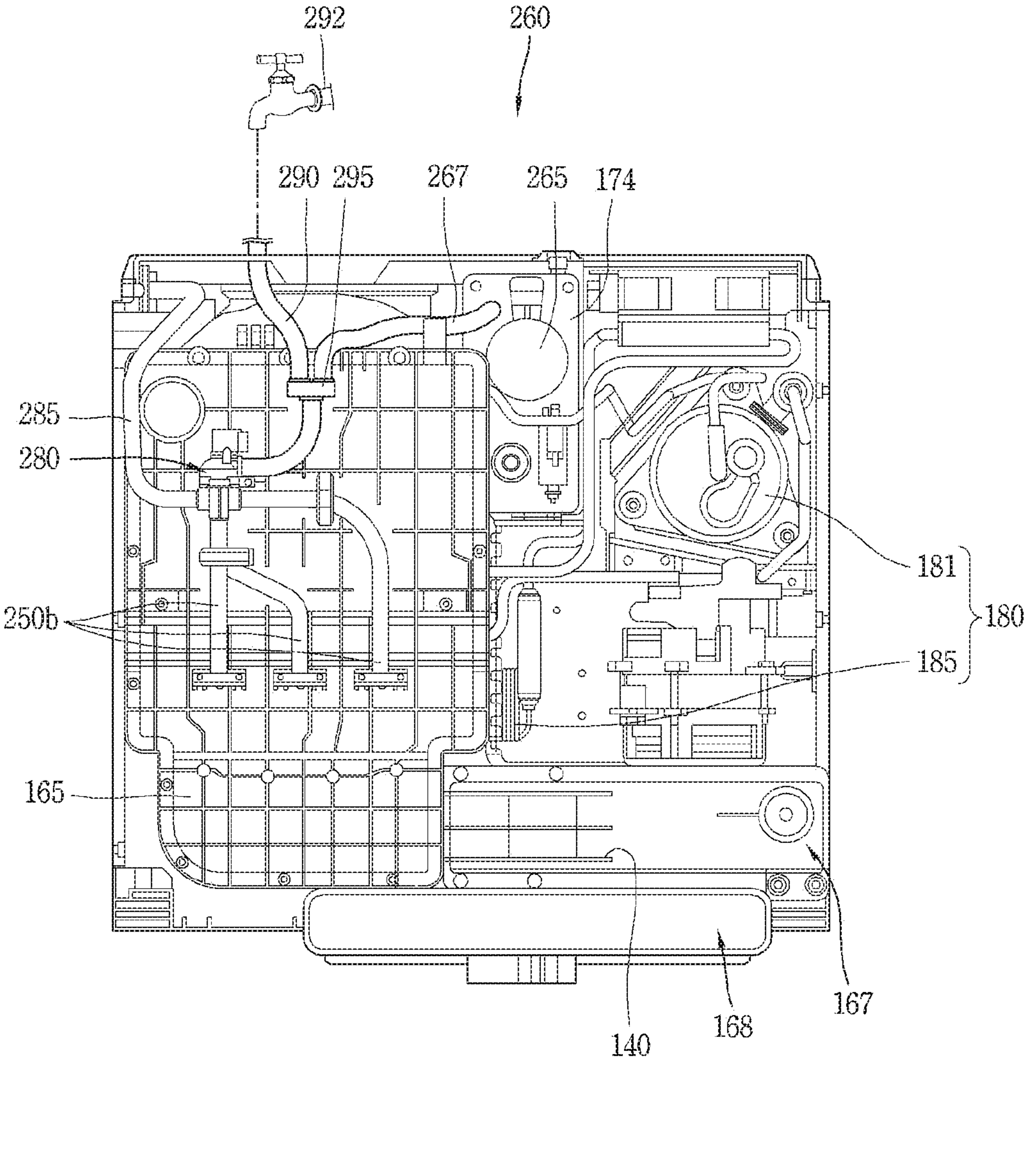
FIG. 11 is a view corresponding to FIG. 3 of another embodiment of the present disclosure.
Figure 12:
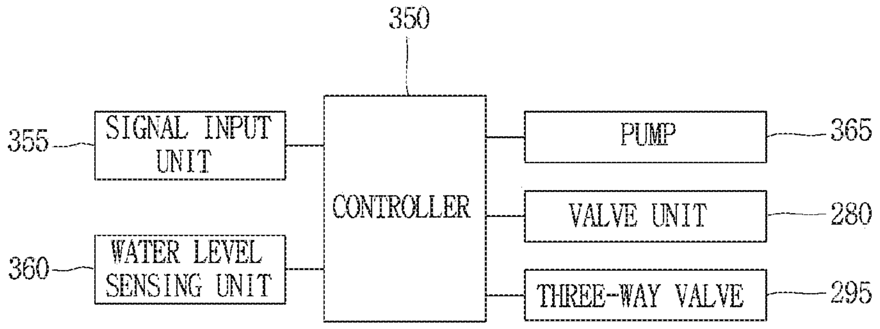
FIG. 12 is a control block diagram of FIG. 1.

Meanwhile, as illustrated in FIG. 11, the water supply part 260 may include a water supply source connection part 290 branched from the pump connection part 267 and connected to a water supply source 292.

The water supply unit 260 may include a 3-way valve 295 provided in a region from which the water supply source connection part 290 and the pump connection part 267 are branched.

The three-way valve 295 may be configured such that either the water supply source 292 or the pump 265 communicates with the valve unit 280.

Accordingly, either water from the water supply source 292 or the condensate water may be selectively supplied to the valve unit 280.

In this embodiment, a case where the three-way valve 295 is provided in the region where the water supply source connection part 290 and the pump connection part 267 are branched to allow the water supply source connection part 290 and the pump connection part 267 to be selectively connected to the valve unit 280 is illustrated, but this is merely illustrative and the water supply source connection part 290 and the pump connection part 267 may be connected to one branch pipe and a water supply source connection part valve and a pump connection part valve for opening and closing each flow channel of the water supply source connection part 290 and the pump connection part 267 may be provided.

Meanwhile, a lint collecting part 310 which allows passage of water and restrains passage of lint to collect lint may be provided below the lint filter 210*a*.

Figure 10:
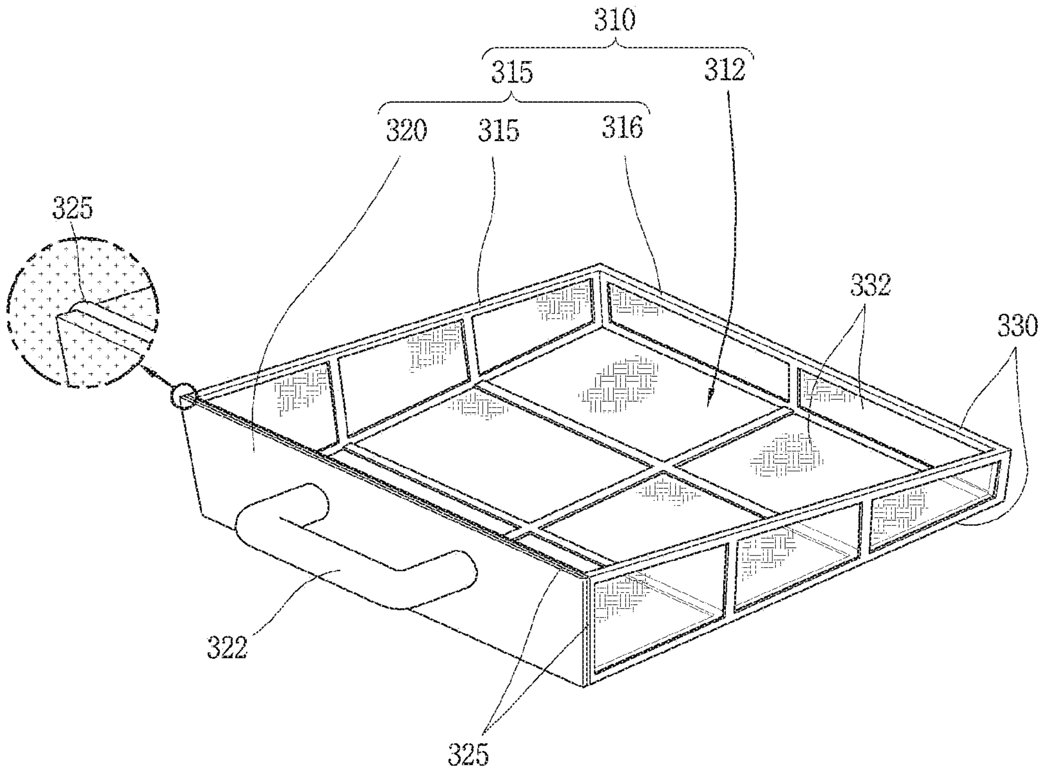
FIG. 10 is a perspective view of a lint collecting unit of FIG. 4.

As shown in FIG. 10, for example, the lint collecting part 310 includes a bottom part 312 and a side wall part 315 extending upward from the edges of the bottom part 312.

The bottom part 312 of the lint collecting part 310 may have a rectangular plate shape.

The side wall part 315 of the lint collecting part 310 may have a rear surface part 316, a front surface part 320 and both side surface parts 317.

For example, the bottom part 312, the rear surface part 316, and the both side surface parts 317 may include a frame 330 forming an opening and a mesh part 332 disposed to block each opening of the frame 330.

The front surface part 320 of the lint collecting part 310 may be formed as a blocking member capable of suppressing passage of air and lint.

The front surface part 320 may be provided with a handle 322 to facilitate handling of the lint collecting part 310.

The handle 322 may be formed to protrude forward from the front surface part 320 so as to be easily gripped.

The bottom part 312 of the lint collecting part 310 may be sloped with respect to the bottom surface of the cabinet 110.

In detail, the lint collecting part 310 may be disposed such that a portion (rear end portion) of the bottom part 312 thereof adjacent to the lint filter 210*a* is higher than the front surface side (front end portion).

For example, the bottom part 312 of the lint collecting part 310 may be disposed to be sloped downward in a forward direction.

According to this configuration, when lint is dropped from the lint filter 210*a* and collected within the lint collecting part 310, the lint may be moved toward the front surface part 320 along the slope of the bottom part 312 so as to be accumulated.

Accordingly, a lint discharging (removing) cycle of the lint collecting part 310 may be extended.

Meanwhile, a lint collecting part receiving part 327 may be formed in a front lower region of the base 160 such that the lint collecting part 310 may be received therein or taken out therefrom.

A sealing member 325 may be provided in a region where the lint filter 210*a* and the lint collecting part receiving part 327 are in contact with each other in order to suppress leakage of air.

The cabinet 110 may have a lint collecting part opening 118 formed to penetrate through a front portion of the cabinet 110 to allow the lint collecting part 310 to be drawn out from the cabinet 110 therethrough.

The lint collecting part opening 118 may be provided with a cover 119 for selectively opening and closing the lint collecting part opening 118, for example.

The cover 119 may be rotatably coupled to one side of the lint collecting part opening 118.

Also, the cover 119 may be configured to be detachable with respect to the lint collecting part opening 118.

Figure 13:
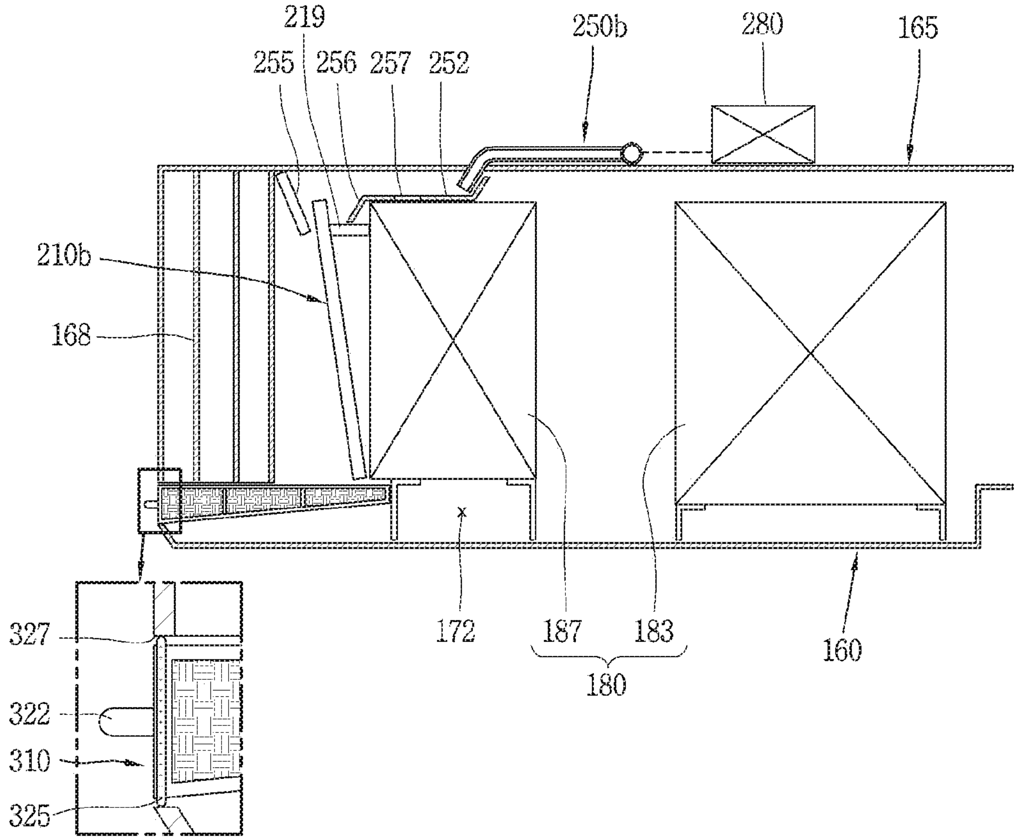
FIG. 13 is a cross-sectional view of a base region of a clothes treating apparatus according to another embodiment of the present disclosure.

As illustrated in FIG. 13, the clothes treating apparatus having a drying function of the present embodiment may include a control unit 350 controlling the valve unit 280 such that water is selectively supplied to the spray tube 250*a*.

The control unit 350 may be implemented as a microprocessor having a control program, for example.

The control unit 350 may include a signal input unit 355 for inputting a control signal of the valve unit 280.

The control signal of the signal input unit 355 may be, for example, a driving time of the blow fan 131.

In detail, when a driving time of the blow fan 131 reaches a predetermined time, the signal input unit 355 may generate and input a control signal to the controller 350.

The control unit 350 may be configured to control the valve unit 280 such that water is sequentially supplied to each spray tube 250*a* when a control signal is input from the signal input unit 355.

The pump 265 pumping the condensate water and the 3-way valve 295 allowing any one of water from the water supply source 292 and condensate water to be supplied to the spray tube 250*a* may controllably connected to the controller 350.

Also, the water level sensing part 360 may be connected to the control unit 350 in a communicating manner such that the 3-way valve may be controlled according to a water level of the condensate water storage 174, for example.

For example, when the water level sensing unit 360 senses a low water level, the controller 350 may control the valve unit 280 such that water from the water supply source 292 may be supplied to the spray tube 250*a*.

According to this configuration, when an object to be dried is put into the drum 120 and a drying process of the object to be dried is performed, the drum 120 and the blow fan 131 may be driven to rotate.

When the drying process of the object to be dried is performed, an operation of the heat pump 180 may be started.

When driving of the blow fan 131 is started, air inside the drum 120 may be moved to the circulation flow channel 130.

Since lint is collected from air introduced into the circulation flow channel 130 by the lint collecting filter 142 of the lint filter installation part 140, lint in the air is reduced.

Air which has passed through the lint filter installation part 142 is guided by the guiding part 167 and passes through the lint filter 210*a*.

The lint filter 210*a* may collect lint in the air to reduce lint.

The lint-removed air passing through the lint filter 210*a* is brought into contact with the evaporator 187 so as to be heat-exchanged and cooled.

Moisture in air is condensed on the surface of the evaporator 187 and moved to a lower side of the condenser 183.

Air which has been heat-exchanged to have a reduced water content may be brought into contact with the condenser 183 so as to be heat-exchanged.

Air which has been heat-exchanged with the condenser 183 to have a high temperature may be introduced to the drum 120 again through the back duct 150.

Air within the back duct 150 may be heated by the electric heater 152 if necessary, so that a temperature thereof may further be raised.

When the drying process is performed, lint may be collected and accumulated in the lint filter 210*a*.

When a driving time of the flow fan 131 reaches a preset time, the signal input unit 355 may output a control signal.

The control unit 350 may control the pump 265 on the basis of a signal input from the signal input unit 355 to supply water to the spray tube 250*a*.

When water is introduced to the valve unit 280 from the pump 265, the control unit 350 may control the valve unit 280 so that water may be sequentially supplied to each spray tube 250*a*.

The water supplied to the spray tube 250*a* is reduced in speed through the diffuser 252 and flow thereof may be stabilized.

The water which has passed through the diffuser 252 may be guided to an upper portion of the front surface of the lint filter 210*a* by the guide plate 255.

The water supplied to the upper portion of the front surface of the lint filter 210*a* comes into contact with the mesh part 215 of the lint filter 210*a* to wash the mesh part 215.

Accordingly, the lint 218 collected by the mesh part 215 falls downward together with water.

Here, the mesh part 215 is disposed to be sloped with respect to a vertical direction of the evaporator 187, so that water in contact with the mesh part 215 moves downward along the slope of the mesh part 215 to easily remove the lint 218 captured by the mesh part 215.

In detail, the lint 218 collected in the mesh part 215 is arranged in a state in which a portion of an upstream side (central portion of the lint 218) faces downward, compared with portions of a downstream side (both end portions of the lint 218), and thus, when the lint 218 comes into contact with water falling along the slope of the upstream side of the mesh part 215, the lint 215 may be easily separated and dropped.

When a low water level of the condensate water storage 174 is sensed by the water level sensing unit 360, the control unit 350 may control the 3-way valve 295 so that water from the water supply source 292 is supplied to the valve unit 292

When a normal water level of the condensate water storage 174 is sensed by the water level sensing unit 360, the control unit 350 may control the 3-way valve 295 to stop water supply from the water supply source 292 and control the pump 265 to resume supply of the condensate water.

Meanwhile, the lint dropped together with the lint filter 210*a* from the lint filter 210*a* may be collected by the lint collector 310.

The water dropped to the bottom part 312 of the lint collecting part 310 may pass through the bottom part 312 and may be temporarily stored in the condensate water collecting part 172 and subsequently moved to the condensate water storage 174.

The lint dropped to the bottom part 312 of the lint collecting part 310 may be restrained from passing through the mesh part 332 of the bottom part 312 and collected on the bottom part 312.

The lint collected on the bottom part 312 of the lint collecting part 310 may be moved to a front region of the bottom part 312 by the slope of the bottom part 312.

The lint collected in the lint collecting part 310 may be removed through the lint collecting part opening 118.

The lint of the lint collecting part 310 may be separated and removed from the lint collecting part 310 after the lint collecting part 310 is taken out of the cabinet 110 through the lint collecting part opening 118.

Hereinafter, another embodiment of the present disclosure will be described with reference to FIGS. 13 to 17.

The clothes treating apparatus having a drying function of this embodiment includes a cabinet 110, a drum 120 installed inside the cabinet 110, a heat-exchanger 182 heat-exchanged with air exhausted from the drum 120, a lint filter 210*b* disposed on an upstream side of the heat-exchanger 182 with respect to flow of air exhausted from the drum 120 to collect lint in the air, a spray tube 250*b* spraying water to the lint filter 210*b* to separate the lint collected in the lint filter 210*b* from the lint filter 210*b*, and a lint collecting unit having at least a portion provided below the lint filter 210*b* or below the heat-exchanger 182 to collect falling lint.

The drum 120 is rotatably installed within the cabinet 110 and a base 120 forming part of a circulation flow channel 130 of air exhausted from the drum 120 may be provided below the drum 120.

The evaporator 187 and the condenser 183 may be provided within the base 160 along an air flow direction.

Meanwhile, a lint filter 210*b* may be provided on the upstream side of the evaporator 187 to collect lint in the air.

The lint filter 210*b* of this embodiment includes a frame 212 forming at least one opening 214 and a mesh part 215 provided in the opening 214 to allow air to pass therethrough and to suppress passage of the lint.

Figure 15:
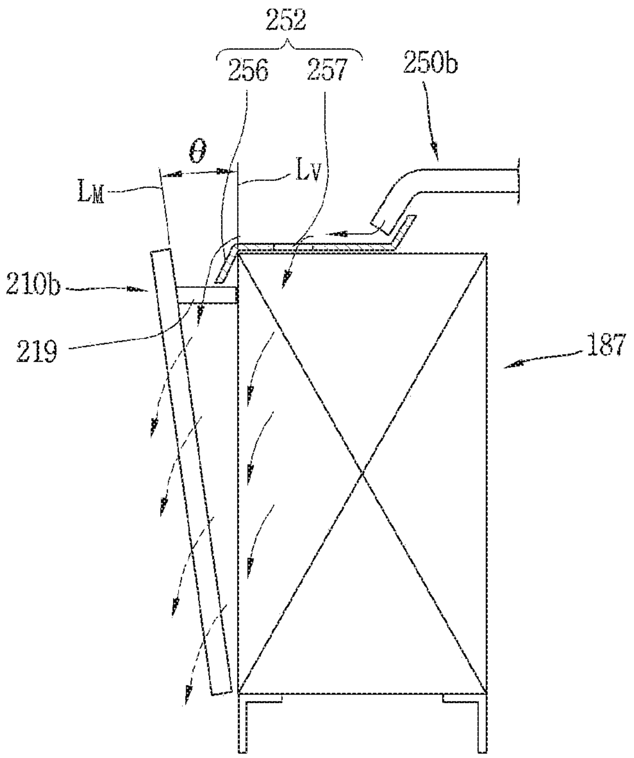
FIG. 15 is an enlarged view of a lint filter region of FIG. 13.

As illustrated in FIG. 15, a vertical center line LM of the mesh part 215 of the lint filter 210*b* may be disposed at a slope angle (8) previously set with respect to a vertical direction of the cabinet 110.

In the lint filter 210*b*, a distance between an upper portion of the mesh part 215 and the evaporator 187 may be larger than a distance between a lower portion of the mesh part 215 and the evaporator 187.

In detail, the lint filter 210*b* may be disposed at a slope angle (θ) of 2 degrees or greater with respect to the vertical direction Lv of the cabinet 110.

Figure 14:
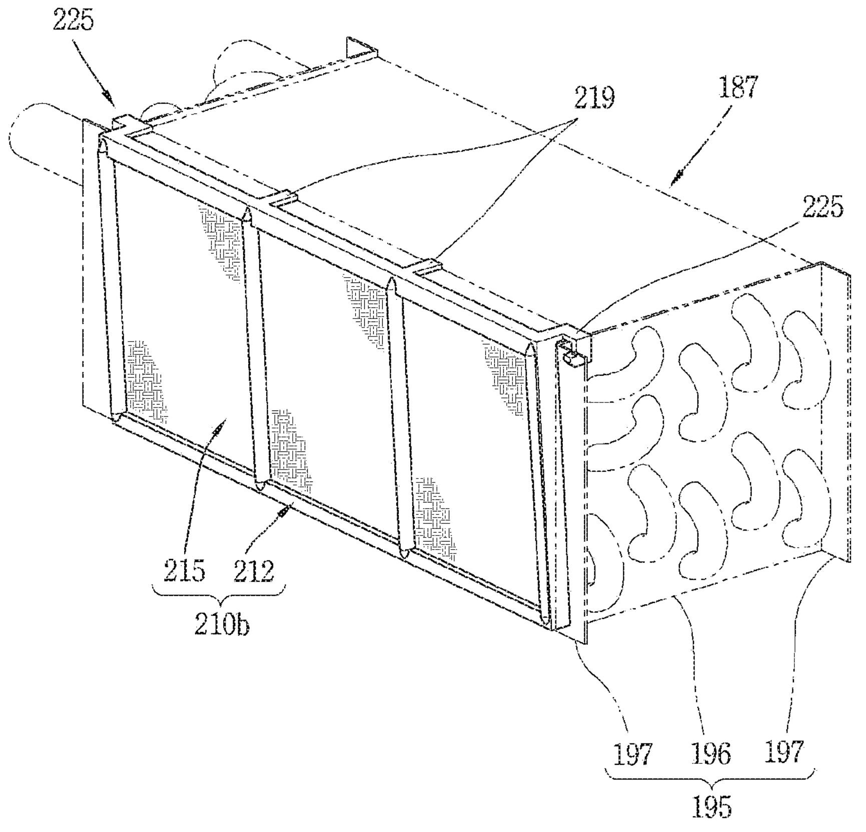
FIG. 14 is a perspective view of a lint filter of FIG. 13.

As illustrated in FIG. 14, the lint filter 210*b* may include a spacer 219 that maintains a gap between the frame 212 and the evaporator 187.

The spacer 219 may protrude from the frame 212 of the lint filter 210*b* toward the evaporator 187.

The spacer 219 may be provided at an upper end portion of the frame 212 of the lint filter 210*b*.

The lint filter 210*b* may include an evaporator coupling part 220 so as to be coupled to the evaporator 187.

The evaporator coupling part 220 may include a hook 225 coupled to end plates 195 on both sides of the evaporator 187.

The hooks 225 may be configured to come into contact an outer surface of the end plate 195 of the evaporator 187 and a rear surface of the bent part 197, respectively.

Meanwhile, a spray tube 250*b* for spraying water to the lint filter 210*b* may be provided in an upper region of the base 160.

The spray tube 250*b* may be configured to allow water to flow to a downstream side of the lint filter 210*b* along a flow direction of air exhausted from the drum 120, for example.

The spray tube 250*b* may be inserted into the cover plate 165 and may include a diffuser 252.

As illustrated in FIG. 15, each of the spray tubes 250*b* may be configured such that an outlet of the diffuser 252 is disposed on a downstream side of the lint filter 210*b* with respect to a direction of air flow.

Water discharged from each spray tube 250*b* may be sprayed to a rear surface of the lint filter 210*b*.

That is, water flowing out from each spray tube 250*b* may be sprayed in a direction opposite to the direction of air flow.

According to this configuration, since water is sprayed in a direction opposite to the direction in which lint is collected in the mesh portion 215 of the lint filter 210*b*, the collected lint may be easily separated from the mesh part 215.

Figure 16:
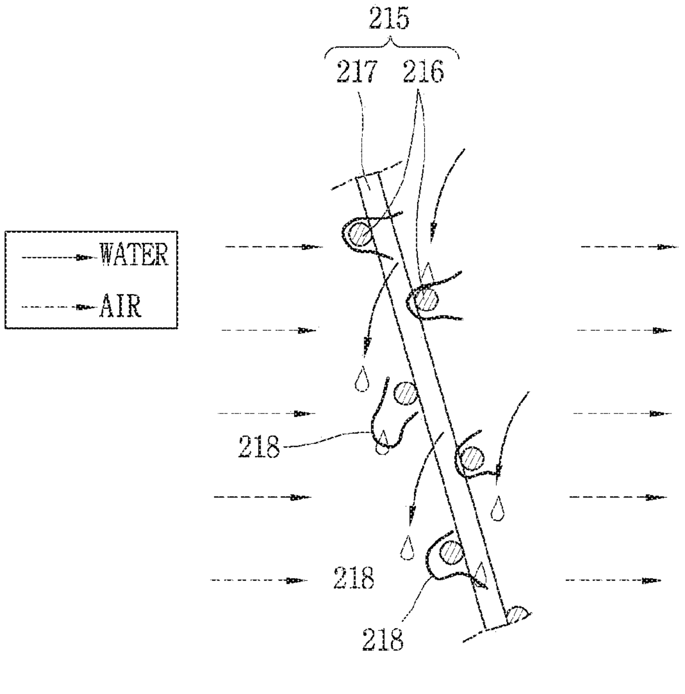
FIG. 16 is an enlarged cross-sectional view of a mesh part of a lint filter of FIG. 15.

In detail, as illustrated in FIG. 16, since the lint 218 in the air exhausted from the drum 120 is collected such that a central portion thereof is disposed on the upstream side of the mesh part 215 and both end portions thereof are disposed on a downstream side of the mesh part 215 and since the lint filter 210*b* is sloped, the central portion of the collected lint 218 is disposed to be lower than the both end portions of the lint 218, whereby the lint 218 may be more easily separated from each of the wires 216 and 217 when water is sprayed thereto.

Meanwhile, referring to FIG. 15, the spray tube 250*b* may include a first spray part 256 for spraying water to the lint filter 210*b* and a second spray part 257 for spraying water to the evaporator 187.

The first spray part 256 and the second spray part 257 may be formed simultaneously in the diffuser 252, for example.

The outlet of the diffuser 252 may be the first spray part 256 and the second spray part 257 may be positioned on an upstream side of the outlet of the diffuser 252 along a flow direction of water of the spray tube 250*b*.

The second spray part 257 may be formed to spray water to an upstream side end region of the evaporator 187 along a flow direction of air exhausted from the drum 120, for example.

Accordingly, lint adhered to the upstream side end portion of the evaporator 187 through the lint filter 210*b* may be separated and removed.

This is to prevent lint having a relatively small size and a small amount of lint which has passed through the lint filter 210*b* from being adhered to and deposited on the surface of the evaporator 187, while most lint in the air is collected by the lint filter 210*b*.

A lint collecting part 310 may be provided below the lint filter 210*b* and the evaporator 187.

Accordingly, the lint dropped from the lint filter 210*b* and the evaporator 187 may be collected.

The lint collecting part 310 may include a bottom part 312 and a side wall part 315 extending upward from the edges of the bottom part 312.

According to this configuration, when a control signal is input from the signal input unit 355, the control unit 350 may control the pump 265 and the valve unit 280 to supply water (condensate water) to the spray tube 250*b*.

The water supplied to the spray tube 250*b* may be sprayed to the evaporator 187 and the lint filter 210*b* through the second spray part 257 and the first spray part 256, respectively.

In detail, the water sprayed to the upper region of the evaporator 187 through the second spray part 257 comes into contact with the evaporator 187 to separate and remove the lint adhered to the surface of the evaporator 187.

Part of the water sprayed to the rear surface of the lint filter 210*b* through the first spray part 256 may fall through the mesh part 215 of the lint filter 210*b* and the other part of the water may drop along the mesh part 215 to separate and remove the lint 218 coupled to the mesh part 215 of the lint filter 210*b*.

The lint drops from the evaporator 187 and the lint filter 210*b* may be collected by the lint collecting part 310.

The water which has passed through the lint collecting part 310 is temporarily accommodated in the condensate water collecting part 172 and moved to the condensate water storage 174 so as to be pumped by the pump 265.

The lint collected in the lint collecting part 310 may be removed after the lint collecting part 310 is drawn out through the lint collecting part opening 118 of the cabinet 110.

Figure 17:
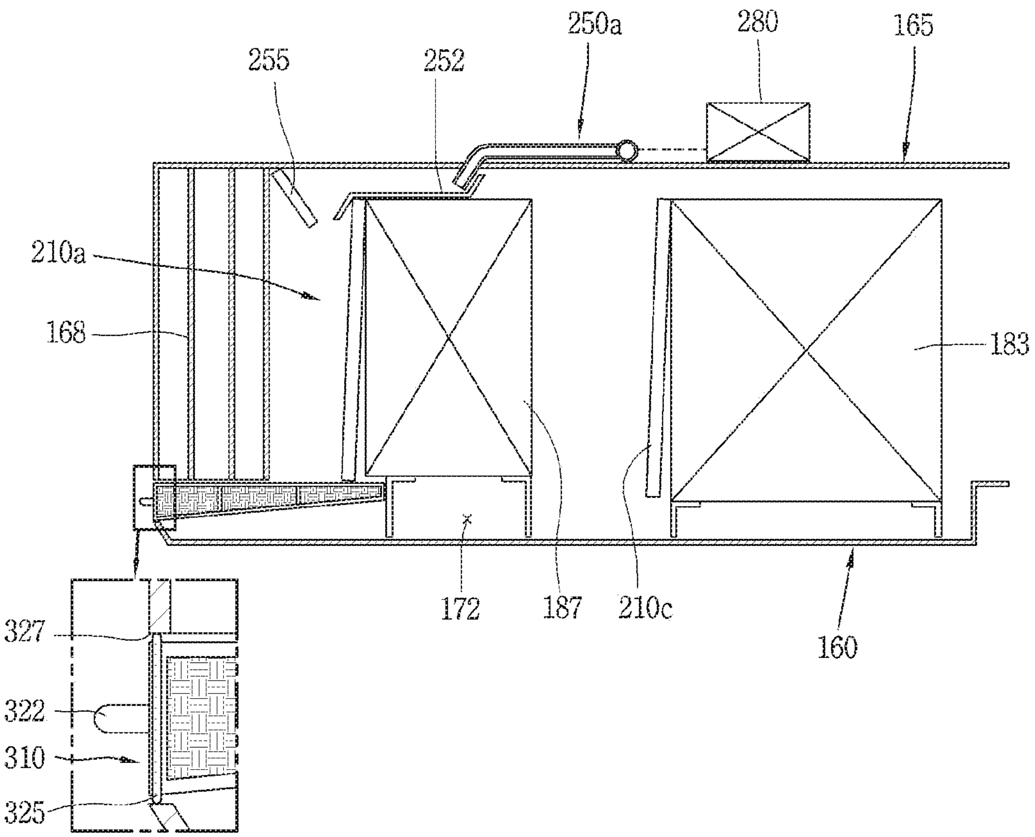
FIG. 17 is a cross-sectional view of a base of a clothes treating apparatus according to another embodiment of the present disclosure, corresponding to FIG. 13.

Meanwhile, FIG. 17 is a cross-sectional view of the base of the clothes treating apparatus according to another embodiment of the present invention, corresponding to FIG. 13. As illustrated in FIG. 17, a condenser lint filter 210*c* may be provided on an upstream side of the condenser 183 along a flow direction of air.

The condenser lint filter 210*c* may be configured to be the same as the lint filters 210*a* and 210*b* described above. For example, the condenser lint filter 210*c* may include a frame 212 having at least one opening 214 and a mesh part 215 provided in the opening 214, allowing the passage of air, and restraining the passage of lint.

As a result, adhesion of lint (lint component) to the surface of the condenser 183 may be suppressed.

According to this configuration, a degradation of efficiency of heat exchange between a refrigerant of the condenser 183 and air as lint is adhered to a surface of the condenser 183 may be restrained.

Also, an increase in flow resistance of the air due to the lint attached to the surface of the condenser 183 may be suppressed.

Also, in the embodiments described above with reference to FIGS. 1 to 13, a condenser lint filter may be provided on one side (upstream side) of the condenser.

In the embodiments described above with reference to FIGS. 13 to 17, a case where the spray tube has both the first spray part and the second spray part is described as an example, but the spray tube may include only the first spray part The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A clothes treating apparatus, comprising:
- a cabinet;
- a drum disposed within the cabinet;
- a heat-exchanger configured to exchange heat with air exhausted from the drum, the heat-exchanger including end plates disposed at opposite ends thereof;
- a lint filter disposed on an upstream side of the heat-exchanger with respect to a flow direction of the air exhausted from the drum, the lint filter being configured to collect lint in the air exhausted from the drum, the lint filter including:
  - a frame having at least one opening;
  - a mesh part disposed in the opening and configured to allow passage of the air exhausted from the drum while restraining passage of lint; and
  - a heat exchanger coupling part coupled to the heat-exchanger, the heat-exchanger coupling part including a hook coupled to each end plate.

2. The clothes treating apparatus of claim 1, wherein each end plate includes a bent part bent in a longitudinal direction of the heat-exchanger, and
- wherein the hook is configured to be in contact with an outer surface of each end plate and with an inward facing surface of the bent part.

3. The clothes treating apparatus of claim 2, wherein the lint filter includes:
- a hook support part having a long plate shape bent backward from an upper end of the frame of the lint filter so as to extend horizontally, and
- the hook is disposed at opposite ends of the hook support part.

4. The clothes treating apparatus of claim 3, wherein the hook includes:
- a horizontal section extending from each of the opposite ends of the hook support part in the longitudinal direction; and
- a vertical section bent downward from an end portion of the horizontal section so that an inner surface of the vertical section contacts the end plate.

5. The clothes treating apparatus of claim 4, wherein the hook includes a contact protrusion protruding from the vertical section to contact the rear surface of the bent part.

6. The clothes treating apparatus of claim 5, wherein one side of the contact protrusion has a guide slope that extends upward from a lower surface of the contact protrusion towards the rear surface of the bent part.

7. The clothes treating apparatus of claim 4, wherein, prior to contacting the end plates, a distance between the inner surfaces of the vertical sections of the hooks is smaller than a distance between the outer surfaces of the end plates.

8. The clothes treating apparatus of claim 1, further comprising:
- a diffuser disposed on a downstream side of the lint filter with respect to the flow direction of the air exhausted from the drum;
- a spray tube configured to spray water on the lint filter or the heat-exchanger such that the lint collected in the lint filter is separated from the lint filter or the lint collected on the heat-exchanger is separated from the heat-exchanger; and
- a lint collecting part disposed below the lint filter or below the heat-exchanger to collect the separated lint.

9. The clothes treating apparatus of claim 8, wherein the lint filter is disposed to be inclined with respect to a vertical direction of the cabinet.

10. The clothes treating apparatus of claim 8, wherein the spray tube is configured to spray the water on a front surface of the lint filter, on a rear surface of the lint filter, or on an upstream end region of the heat-exchanger along the flow direction of the air exhausted from the drum.

11. The clothes treating apparatus of claim 8, wherein the lint collecting part includes:
- a bottom part, the bottom part being configured to allow passage of the water and restrain passage of the lint dropped on the bottom part; and
- a side wall part extending upward from edges of the bottom part.

12. The clothes treating apparatus of claim 8, wherein the spray tube includes:

a first spray part configured to spray a first portion of the water on the lint filter; and a second spray part configured to spray a second portion of the water on the heat-exchanger, and wherein the diffuser is integrally formed with the first spray part and the second spray part.

13. The clothes treating apparatus of claim 8, wherein a space between an upper portion of the mesh part and the heat-exchanger is smaller than a space between a lower portion of the mesh part and the heat-exchanger.

14. The clothes treating apparatus of claim 8, wherein the spray tube includes an outlet, and water passing through the outlet of the spray tube is guided to an upper portion of the lint filter, thereby allowing the water to flow downward along the mesh part of the lint filter.

15. The clothes treating apparatus of claim 8, wherein the spray tube is provided as a plurality of spray tubes, and the plurality of spray tubes are spaced apart from each other horizontally.

16. The clothes treating apparatus of claim 15, wherein an outlet of each of the plurality of spray tubes is disposed on an upstream side of the lint filter with respect to a flow direction of the air exhausted from the drum.

17. The clothes treating apparatus of claim 8, wherein a space between an upper portion of the mesh part and the heat-exchanger is greater than a space between a lower portion of the mesh part and the heat-exchanger.

18. The clothes treating apparatus of claim 17, wherein the frame has a spacer configured to maintain a space between the frame and the heat-exchanger.

19. The clothes treating apparatus of claim 17, wherein an outlet of the spray tube is disposed on a downstream side of the lint filter with respect to the flow direction of the air exhausted from the drum.

20. The clothes treating apparatus of claim 8, wherein the spray tube includes:

a first spray part configured to spray a first portion of the water on the lint filter; and a second spray part configured to spray a second portion of the water on the heat-exchanger, wherein an outlet of the diffuser includes the first spray part, and wherein the second spray part is positioned on an upstream side of the outlet of the diffuser along a flow direction of the water in the spray tube.

21. The clothes treating apparatus of claim 1, wherein the cabinet includes a lint collecting part opening configured to allow the lint collecting part to be extracted from the cabinet.

22. A clothes treating apparatus, comprising:

a cabinet;

a drum provided within the cabinet;

a heat-exchanger configured to exchange heat with air exhausted from the drum;

a lint filter disposed on an upstream side of the heat-exchanger with respect to a flow direction of the air exhausted from the drum and configured to collect lint in the air, wherein the lint filter includes a frame having at least one opening, and a mesh part provided in the opening and configured to allow passage of air while restraining passage of lint;

a diffuser disposed on a downstream side of the lint filter with respect to the flow direction of the air;

a spray tube configured to spray water on the lint filter or the heat-exchanger such that the lint collected in the lint filter is separated from the lint filter or the lint collected on the heat-exchanger is separated from the heat-exchanger; and a lint collecting part provided below the lint filter or below the heat-exchanger to collect the separated lint, wherein the mesh part is disposed to be inclined with respect to a vertical direction of the cabinet, wherein the spray tube is configured to spray the water on a front surface or a rear surface of the lint filter, or on an upstream side end region of the heat-exchanger along the flow direction of the air exhausted from the drum, wherein the spray tube includes:

a first spray part configured to spray a first portion of the water on the lint filter; and a second spray part configured to spray a second portion of the water on the heat-exchanger, and wherein the diffuser includes the first spray part and the second spray part.

23. The clothes treating apparatus of claim 22, wherein a space between an upper portion of the mesh part and the heat-exchanger is smaller than a space between a lower portion of the mesh part and the heat-exchanger.

* * * * *